Figure 1:
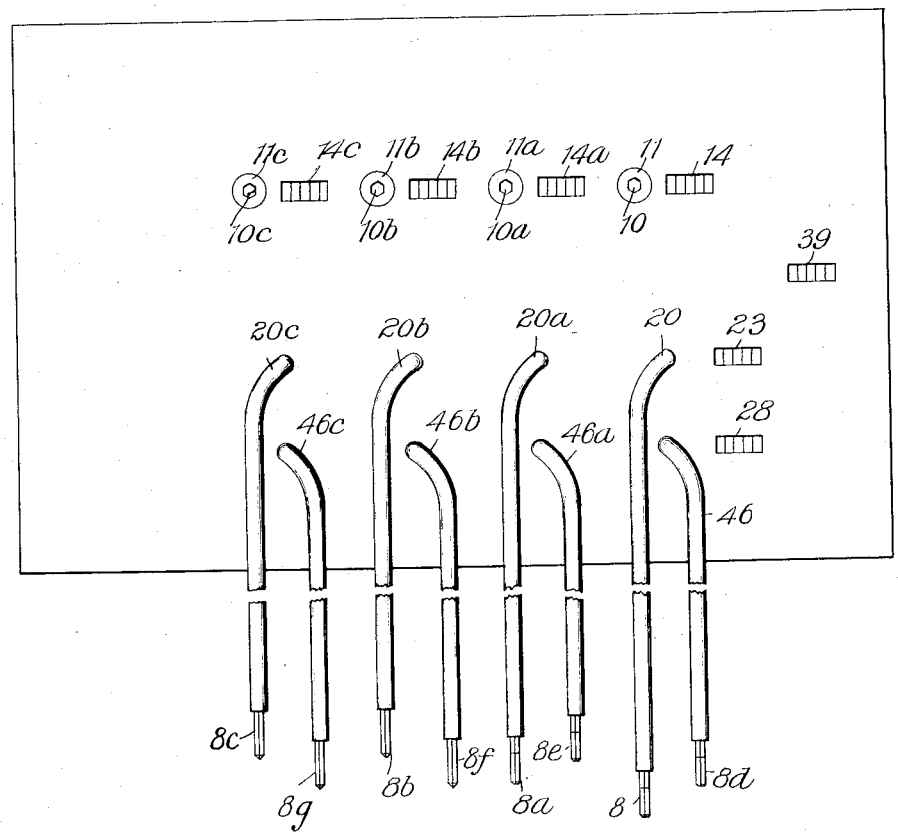

F. O. HEUSER.
WAGE AND JOB ACCOUNTING SYSTEM.
APPLICATION FILED MAR. 5, 1909.

1,084,632.

Patented Jan. 20, 1914.
3 SHEETS—SHEET 1.

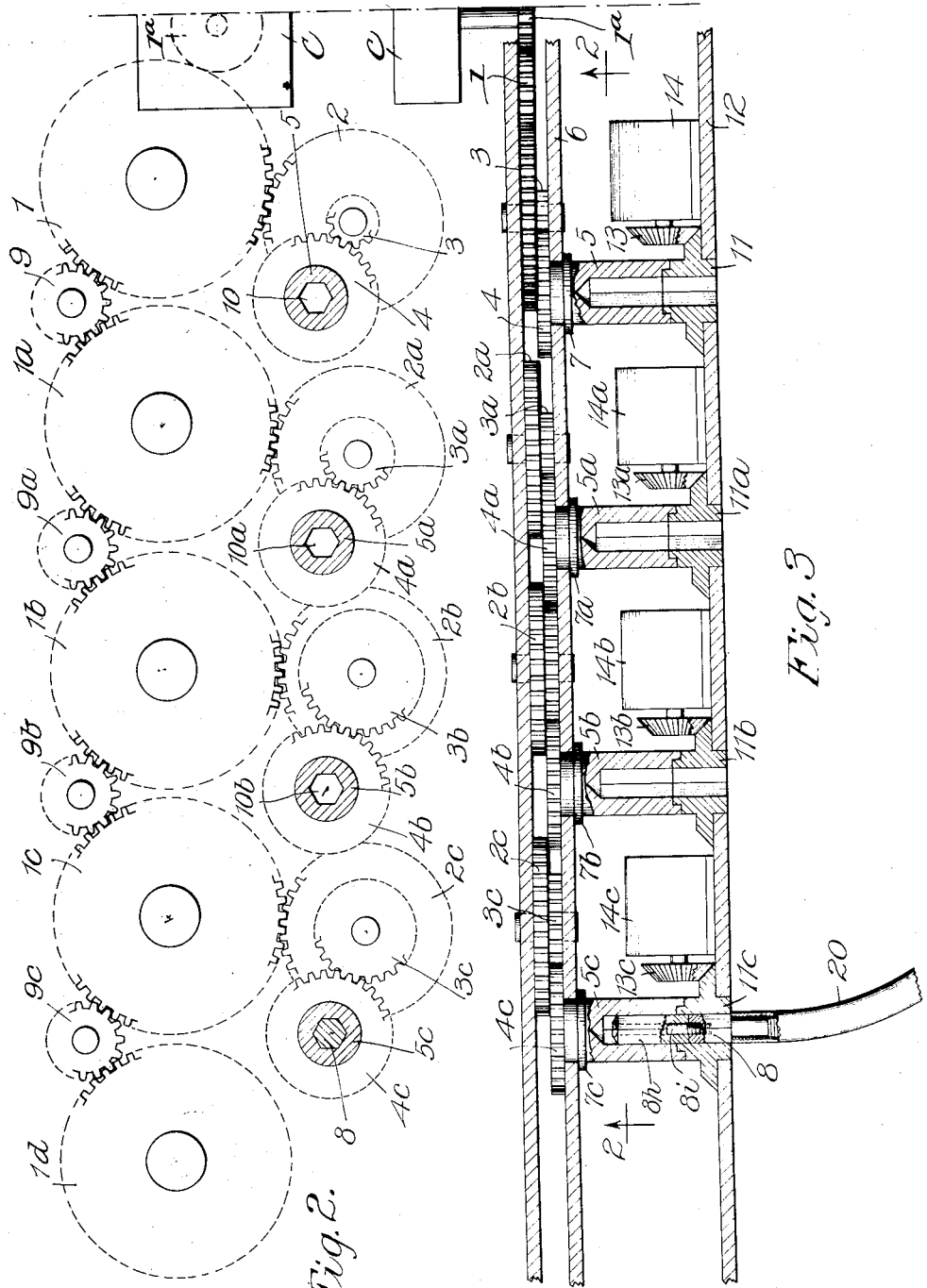

F. O. HEUSER.
WAGE AND JOB ACCOUNTING SYSTEM.
APPLICATION FILED MAR. 5, 1909.
1,084,632.
Patented Jan. 20, 1914.
3 SHEETS—SHEET 3.
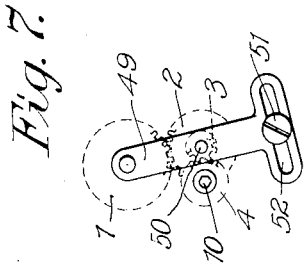
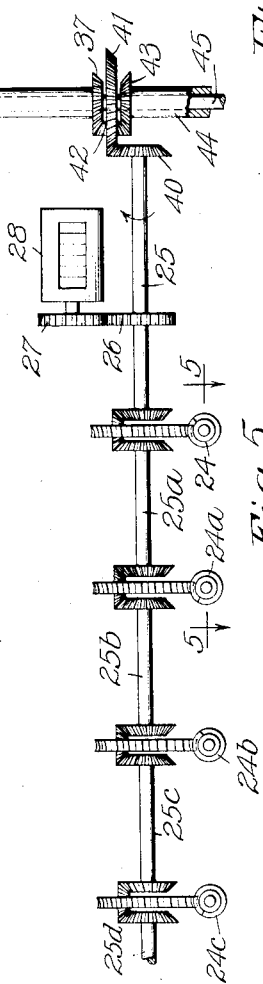
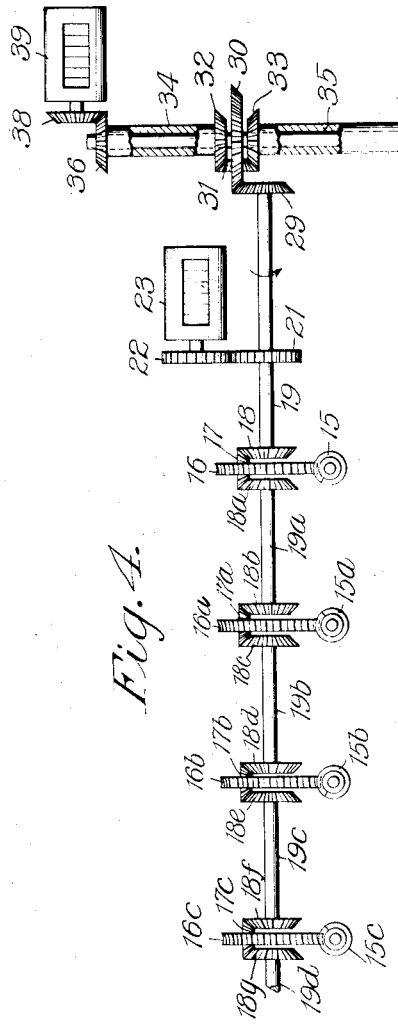
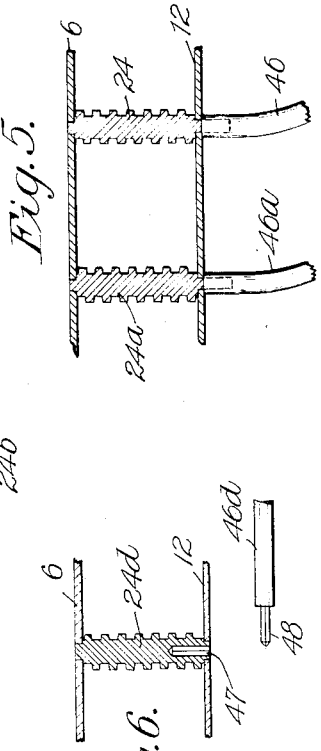
Witnesses:
Leonard W. Novander
Albert J. McCaleb
Inventor
Frederick O. Heuser
By Brown & Williams
Attorneys

UNITED STATES PATENT OFFICE.

FREDERICK O. HEUSER, OF CHICAGO, ILLINOIS, ASSIGNOR, BY MESNE ASSIGNMENTS, TO WILLIAM R. HEATH, OF BUFFALO, NEW YORK.

WAGE AND JOB ACCOUNTING SYSTEM.

1,084,632.  Specification of Letters Patent.   Patented Jan. 20, 1914.

Application filed March 5, 1909. Serial No. 481,377.

*To all whom it may concern:*

Be it known that I, FREDERICK O. HEUSER, a citizen of the United States, residing at Chicago, in the county of Cook and State of Illinois, have invented a certain new and useful Improvement in Wage and Job Accounting Systems, of which the following is a full, clear, concise, and exact description, reference being had to the accompanying drawings, forming a part of this specification.

My invention relates to an improved wage and job accounting system in which the registers used for indicating the wages of the several workmen and the amounts charged to the several jobs are mechanically operated, and furthermore that these registers are connected to suitable time-controlled actuating mechanism by mechanical means.

In my invention I employ a main time-controlled actuating member or a plurality of such members, the operation of which is continuous, and I further provide that the operation of the registers driven by such mechanism or mechanisms when properly connected shall also be continuous and not intermittent.

By my invention I further provide that in order to connect any desired workman's wage-register with the time-controlled mechanism and to connect a desired job-register to simultaneously indicate the amount of operation of the wage-register, but a single selection or operation is required on the part of the workman. This is a substantial improvement over those systems in which two selections and operations are required, one to connect the workman's wage-register with the time-controlled mechanism and the other to connect a desired job-register with the operating mechanism of the connected wage-register.

By my invention I provide that a plurality of workmen may be connected to the same job-register at the same time, and by cumulative gearing I cause the job-register to operate at a rate proportional to the sum of the rates of operation of the connected wage-registers.

By my invention I further provide that a plurality of job-registers may be employed in connection with any desired number of wage-registers and that any wage-register may be connected to any job-register, as desired.

My invention further contemplates the use of gearing for securing a desired rate of operation of any one of the wage-registers, which gearing may be readily changed to effect any desired rate of operation of such register.

The several drawings illustrating my invention are as follows:

Figure 1 is a face view of a connecting board for use with my accounting system; Fig. 2 is a diagrammatic view taken along the line 2, 2 of Fig. 3 of the gearing employed to connect the time-controlled mechanism or mechanisms with spindles used to drive the registers when desired. Fig. 3 is a plan view of the connecting gearing used between the time-controlled mechanism and the spindles. In this view is also shown the wage-registers and the connecting board; Fig. 4 is a diagrammatic view of the cumulative gearing used in connection with the job-registers for operating these registers as described. In this view there is shown also a totalizing-register for the job-registers; Fig. 5 is a detail plan view taken along the line 5, 5 in Fig. 4, and shows the connection of the actuating worms of the job-register gearing to suitable flexible connecting shafts; Fig. 6 is a view similar to Fig. 5 and shows a modified form of connection that may be used between a flexible shaft and one of the worms; and Fig. 7 is a detail view showing a means that may be employed for changing the gear ratio of one of the driving trains shown in Fig. 2.

Similar numerals refer to similar parts throughout the several drawings.

As shown in Figs. 2 and 3, the time-controlled mechanism consists in a plurality of gears 1, 1a, 1b, 1c, 1d, connected together by intermediate gears 9, 9a, 9b, 9c, and time controlled mechanism comprising, for example, suitable clock-work mechanism as shown diagrammatically which by means of a gear 1a connected therewith is adapted to drive the gears 1. These gears may be driven in any suitable manner not shown, so that the rotation is uniform and bears some fixed relation to the unit of time used in calculating the amount of wages indicated by the wage-registers. Each of the gears 1, 1a, 1b, 1c has connected to it a second gear 2, 2a, 2b, 2c, these gears being of the same size as each other. Each of the gears 2, 2a, 2b, 2c has rigidly secured thereto a gear 3, 3a, 3b, 3c. The gears 3, 3a, 3b, 3c may have any size desired, and these gears mesh with gears 4, 4a, 4b, 4c, carried by the spindles 5, 5a, 5b, 5c. Each spindle 5, 5a, 5b, 5c is supported by the plate 6 and retained in such position by a collar 7, 7a, 7b, 7c, secured to the spindle. Each spindle has formed therein a central axial opening, preferably irregular in conformation and adapted to engage a plug 8 secured to one end of the flexible shaft 20, which plug is of a conformation corresponding to the openings 10, 10a, 10b, 10c formed in the spindles 5, 5a, 5b, 5c. Beveled gears 11, 11a, 11b, 11c are supported by the connecting board 12 in axial alinement with the corresponding spindles 5, 5a, 5b, 5c. Each of these gears has formed therethrough a central axial aperture corresponding in conformation with the apertures formed in the spindles. The several beveled gears engage similar gears 13, 13a, 13b, 13c, which constitute the driving gears of the wage-registers 14, 14a, 14b, 14c, each of such registers being assigned to a different workman using the accounting mechanism. The connecting board 12 and the plate 6 are disposed in parallel arrangement in such a manner that the spindles 5, 5a, 5b, 5c retain the gears 11, 11a, 11b, 11c in place in the connecting board.

In addition to the mechanism above described there is also supported from the framework, gearing as shown diagrammatically in Fig. 4. This gearing consists of two sets of worms one over the other, each set being designed to operate an associated register. The upper set of worms 15, 15a, 15b, 15c mesh with worm wheels 16, 16a, 16b, 16c, which carry beveled gears 17, 17a, 17b, 17c. The gear 17 meshes with similar beveled gears 18 and 18a carried by shafts 19 and 19a. The gear 17a meshes with similar beveled gears 18b and 18c secured to the shafts 19a and 19b. The beveled gear 17b meshes with similar beveled gears 18d and 18e secured to shafts 19b and 19c. Gear 17c meshes with similar beveled gears 18f and 18g secured to shafts 19c and 19d. As a result of the gearing arrangement above described it will be noticed that the operation of any one of the worms 15, 15a, 15b, 15c will cause the operation of the shaft 19. Furthermore, if several of these worms be rotated at the same time, the shaft 19 will be rotated at a rate corresponding to the sum of the rates of rotation of the worms, providing the direction of rotation of the gears 16, 16a, 16b, 16c is caused to alternate; that is, that the gears 16 and 16b be caused to rotate in the same direction and the reverse of that of the rotation of the gears 16a and 16c. This may readily be accomplished for a common direction of rotation of the worms 15, 15a, 15b, 15c by making the worms 15 and 15b with a right hand thread, while the worms 15a and 15c are made with a left hand thread. These worms have connected thereto, as indicated in Fig. 1, flexible shafts 20, 20a, 20b, 20c, the other ends of which are provided with plugs 8, 8a, 8b, 8c, any one of which is adapted to engage and register with the openings in any one of the gears 11, 11a, 11b, 11c and the associated spindles 5, 5a, 5b, 5c. The shaft 19 has secured thereto a gear 21, meshing with a similar gear 22 adapted to drive the register 23. The register 23 is designed to indicate the total operation of the worms 15, 15a, 15b, 15c, whether these worms operate singly or together. The second or lower set of worms 24, 24a, 24b, 24c is similar to that described above and its relation to the gearing driven thereby is similar, as a result of which the shaft 25 is caused to rotate by this set of worms in a manner similar to the operation by the worms 15, 15a, 15b, 15c of the shaft 19. The only difference is that each of the worms 24, 24a, 24b, 24c is provided with the opposite thread to the corresponding worm 15, 15a, 15b, 15c, as a result of which the shaft 25 is caused to rotate in a direction opposite to that imparted to the shaft 19, assuming that all of the worms are rotated in the same direction. The shaft 25 has secured thereto a gear 26, meshing with a similar gear 27, which forms the driving gear of a register 28, which register is adapted to indicate the total operation of the worms 24, 24a, 24b, 24c, whether these worms be operated singly or together. The shaft 19 has also secured thereto a beveled gear 29, meshing with a similar beveled gear 30, which beveled gear has mounted therein a beveled gear 31. The beveled gear 31 meshes with two similar beveled gears 32 and 33 secured to sleeves 34 and 35, respectively, which sleeves at their opposite ends carry beveled gears 36 and 37. The beveled gear 36 meshes with a similar beveled gear 38, which constitutes the driving gear of a register 39. The shaft 25 has secured thereto a beveled gear 40 meshing with a beveled gear 41, which carries mounted therein a beveled gear 42. The beveled gear 42 engages the similar beveled gears 37 and 43 secured to the sleeves 35 and 44, respectively. The shaft 45 constitutes a common support for the sleeves 34, 35 and 44 and the gears 30 and 41. From the gearing connection just described between the shafts 19 and 25 and the register 39 it is apparent that since the shafts 19 and 25 are caused to rotate in opposite directions, the motion imparted to the gear 36 and therefore to the register 39 will represent the sum of the rotations of the shafts 19 and 25.

In Fig. 5 there is shown a detail view illustrating the connection of the flexible shafts 46, 46a with the worms 24, 24a.

In Fig. 6 there is shown a construction by which a worm 24d may be provided with a removable flexible shaft by having formed in the end of the worm a central axial opening 47 of an irregular conformation, adapted to register with the conformation of a plug 48, carried by one end of one of the flexible shafts 46d.

As mentioned above, each one of the registers 14, 14a, 14b, 14c is assigned to a separate workman, the train of gearing between the corresponding gear 11, 11a, 11b, 11c and the time-controlled mechanism being such as to actuate the register at the rate paid to the workman. The gears 11, 11a, 11b, 11c are normally disconnected from the driving mechanism. The flexible shafts 20, 20a, 20b, 20c are all assigned to one particular job, the amount of work or the expense involved in such work expended upon this job being indicated by the register 23. Similarly, the flexible shafts 46, 46a, 46b, 46c are assigned to a second job, for which the register 28 indicates the amount of work done on the second job or the expense involved in this work. The register 39 serves to indicate the total amount of work or expense of the two jobs. When a workman enters the factory and is assigned to a particular job, say the job corresponding to the flexible shafts 20, 20a, 20b, 20c, he picks up one of these shafts and inserts the corresponding plug 8, 8a, 8b, 8c into the opening 10, 10a, 10b, 10c corresponding to the wage-register assigned to him. The plug thus inserted engages the corresponding gear 11, 11a, 11b, or 11c and its associated spindle 5, 5a, 5b, 5c, as a result of which the workman's register is operated, and by means of the flexible shaft, the job-register 23 is also operated. If a second workman is subsequently assigned to the same job, he selects a second one of the flexible shafts 20, 20a, 20b, 20c and inserts the plug into the opening 10, 10a, 10b, 10c corresponding to his wage-register, with the result that his register is operated and at the same time his rate is added to the operation of the job-register 23. If at this same time workmen are assigned to the second job, by connecting the flexible shafts 46, 46a, 46b, 46c with their wage-register operating gearing, their wage-registers are operated and at the same time the job-register 28 is operated to indicate the total actuation of such wage-registers last connected. The register 39 is operated in any event to indicate the operation of the register 23 or the operation of the register 28, or the added operation of these two registers if they are connected at the same time to the time-controlled mechanism.

In order that any workman's rate may be readily changed, it is desirable that the gears indicated at 2 and 3 in Fig. 2 be readily removable and that other gears may be substituted in their stead. In order to facilitate this change of gearing, I may employ a construction indicated in Fig. 7, in which a bracket 49 is mounted to swing about the axis of the gear 1 and is adapted to carry, by means of a stud 50 secured in the bracket, the gears 2 and 3, which as above described are rigidly secured together. The bracket 49 may be secured in any desired position relatively to the gear 4 by means of a clamping screw 51 adapted to move when released in a clearance slot 52 formed in the bracket 49. By means of this arrangement all that is necessary in order to change the rate of operation of any workman's register is to loosen the screw 51, swing the bracket 49 so as to disengage the gears 3 and 4, remove the gears 2 and 3 from the stud 50 and place upon such stud a pair of gears, of which the new gear 3 is of a proper size to drive the gear 4 at the desired rate. I do not find it desirable generally to change the size of the gear 2, as a result of which the stud 50 is rigidly secured in the bracket 49. When the desired pair of gears 2 and 3 is placed on the stud 50, bracket 49 is swung so as to bring the gears 3 and 4 into proper engagement and the bracket 49 is retained in this position by means of the clamping screw 51.

It is to be understood that the arrangement shown in Fig. 4 contemplates the use of as many worms in each set as it is found necessary to have in order to accommodate all of the workmen that may be required upon the job. Also that as many different sets of worms may be employed as are necessary to take care of the different jobs being done in the factory. For any desired number of jobs the register 39 is designed to indicate the total work done. It is to be understood that in any event the end shaft just to the left of the last worm of each set is to be rigidly held and prevented from turning, in order that the rotation imparted by the worms may be carried through the several shafts referred to and cause to rotate the gears 21 and 29. For the arrangement of worms shown in the drawings the shafts 19d and 25d would be so held. Similarly, the sleeve 44 immediately below the gearing connected to the driving shaft of the last job-register would be rigidly held and prevented from rotating in order that the totalizing from the several job-register driving shafts may be carried upward to the totalizing register.

As shown in Fig. 3, the connecting plug consists of a portion 8 rigidly secured to the flexible shaft 20, and a second portion 8h secured to the portion 8 by means of a screw 8i extending longitudinally through the portion 8h, and into the portion 8. As a result of this construction, the portion of the plug 8h is free to turn on the screw 8i and rotation therefore, on the portion 8h does not serve to drive the shaft 20. As a result of this construction, the operation of the wage register and job register from the time controlled gearing may be considered as a strictly series operation, that is, the time controlled gearing drives the wage register as a result of the connection of one of the spindles 5, 5a, 5b, 5c with the corresponding beveled gear 11, 11a, 11b, 11c, by means of the portion 8h, and the beveled gear operated in turn drives the flexible shaft by means of the portion 8. Under many conditions, this series arrangement of operation is desirable. In some cases, however, it is not necessary to use an arrangement that is strictly series in its operation, and in such connections the mechanism may be somewhat simplified by using plugs, each consisting of a single member rigidly secured to a corresponding flexible shaft, as indicated, for the plugs 8b, 8e, 8f, 8g in Fig. 1.

While I have shown my invention in the particular embodiment herein disclosed, I do not, however, limit myself to this construction, but desire to claim broadly any equivalent that will suggest itself to those skilled in the art.

What I claim is:

1. In a wage-registering system, the combination of a wage-register, a job-register, time-controlled mechanism, and means for connecting such time-controlled mechanism with the wage-register and the job-register by a single operation and thereby effecting a continuous operation of such registers.

2. In a wage-registering system, the combination of a wage-register, a job-register, time-controlled mechanism, and a connecting device for continuously driving both of such registers when such device is connected to the time-controlled mechanism.

3. In a wage-registering system, the combination of a wage-register, a job-register, time-controlled mechanism, and driving means for one of such registers, such driving means adapted when connected to the time-controlled mechanism to engage and continuously operate the other register.

4. In a wage-registering system, the combination of a wage-register, a job-register, time-controlled mechanism, and driving means for each of such registers, such driving means adapted to be connected to the time-controlled mechanism by a single operation to continuously operate such registers.

5. In combination, a first register, a driving element, a second element associated with but independent of the first element, such second element constituting the means for driving said first register, a third element adapted to engage the first two elements, and a second register driven by the third element, such engagement of the three elements serving to continuously operate both registers.

6. In combination, a first register, two axially alined rotatable and independent elements, the first one of such elements constituting a driving element and the second of such elements constituting a means for driving said first register, a third element adapted to engage the first two elements, and a second register driven by the third element, such engagement of the three elements serving to continuously operate both registers.

7. In combination, a first register, a driving element, a second element associated with but independent of the first element, such second element constituting the means for driving said first register, a third element adapted to engage by one operation the first two elements, and a second register driven by the third element, such engagement of the three elements serving to continuously operate both registers.

8. In combination, a first register, two axially alined rotatable and independent elements, the first one of such elements constituting a driving element and the second of such elements constituting the means for driving said first register, a second register, a flexible operating shaft connected to such second register, and a plug secured to such shaft, such plug adapted to engage both of such elements to continuously operate such registers.

9. In a wage-registering system, the combination of time-controlled driving mechanism, a plurality of wage-registers, a member for each wage-register connected to such mechanism by gearing having a ratio corresponding to the wage rate of such register, a second member geared to such register and associated with but independent of the first member, a job-register, and driving means for such job-register, such driving means adapted to engage both members of any of the wage-registers to continuously operate the corresponding wage-register and the job-register.

10. In a wage-registering system, the combination of time-controlled driving mechanism, a plurality of wage-registers, a rotatable member for each wage-register connected to such mechanism by gearing having a ratio corresponding to the wage rate of such register, a second member geared to such register and axially alined with but independent of the first member, a job-register and a shaft connected to such job-register, such shaft adapted to engage both members of any of the wage-registers to continuously operate the corresponding wage-register and the job-register.

11. In a wage-registering system, the combination of time-controlled driving mechanism, a plurality of wage-registers, a member for each wage-register connected to such mechanism by gearing having a ratio corresponding to the wage rate of such register, a second member geared to such register and associated with but independent of the first member, a job-register, a flexible shaft for driving the job-register, and a plug connected to such shaft, such plug adapted to engage both members of any one of the wage-registers to continuously operate the corresponding wage-register and the job-register.

12. In a wage-registering system, the combination of time-controlled driving mechanism, a plurality of wage-registers, a member for each wage-register connected to such register by gearing having a ratio corresponding to the wage rate of such register, means for changing such gear ratio as desired, a second member geared to such register and associated with but independent of the first member, a job-register, and driving means for such job-register, such driving means adapted to engage both members of any of the wage-registers to continuously operate the corresponding wage-register and the job-register.

13. In a wage-registering system, the combination of time-controlled driving mechanism, a plurality of wage-registers, a member for each wage-register connected to such mechanism by gearing having a ratio corresponding to the wage rate of such register, a second member geared to such register and associated with but independent of the first member, a job-register, and a plurality of driving mechanisms for such job-register, each of such job-register driving mechanisms adapted to engage both members of any of the wage-registers to continuously operate the corresponding wage-register and the job-register.

14. In a wage-registering system, the combination of time-controlled driving mechanism, a plurality of wage-registers, a member for each wage-register connected to such mechanism by gearing having a ratio corresponding to the wage rate of such register, a second member geared to such register and associated with but independent of the first member, a job-register, and a plurality of driving mechanisms for such job-register, each of such job-register driving mechanisms adapted to engage both members of any of the wage-registers to continuously operate the corresponding wage-register and the job-register, such job-register driving mechanisms so related that the connection of two or more of them to the driving members of two or more of the wage-registers will drive the job-register at a rate proportional to the sum of the rates of operation of the connected wage-registers.

15. In a wage-registering system, the combination of time-controlled driving mechanism, a plurality of wage-registers, a member for each wage-register connected to such mechanism by gearing having a ratio corresponding to the wage rate of such register, a second member geared to such register and associated with but independent of the first member, a plurality of job-registers, a plurality of driving mechanisms for each of such job-registers, each of such job-register driving mechanisms adapted to engage both members of any of the wage-registers to continuously operate the corresponding wage-register and the job-register, such job-register driving mechanisms so related that the connection of two or more of them associated with either job-register to the driving members of two or more of the wage-registers will drive the job-register thus connected at a rate proportional to the sum of the rates of operation of the connected wage-registers, and a totalizing register for indicating the total of the actuations of the job-registers.

16. In a wage-registering system, a plurality of intermeshing time-controlled gears, a plurality of wage-registers, a plurality of spindles, gearing between each time-controlled gear and a corresponding spindle, a driving gear in axial alinement with each spindle for operating one of the wage-registers, a job-register, and a flexible shaft for connecting together the job-register, any driving gear and the corresponding spindle.

17. In a wage-registering system, a plurality of intermeshing time-controlled gears, a plurality of wage-registers, a plurality of spindles, gearing between each time-controlled gear and a corresponding spindle, a driving gear in axial alinement with each spindle for operating one of the wage-registers, a job-register, a flexible shaft for driving the job-register, and a plug secured to the shaft for engaging any one of the driving gears and the corresponding spindle.

18. In a wage-registering system, a plurality of intermeshing time-controlled gears, a plurality of wage-registers, a plurality of spindles, gearing between each time-controlled gear and a corresponding spindle, a driving gear in axial alinement with each spindle for operating one of the wage-registers, a job-register, a flexible shaft for connecting together the job-register, any driving gear and the corresponding spindle, and means for changing the gear ratio between any time-controlled gear and the corresponding spindle.

19. In a wage-registering system, a plurality of intermeshing time-controlled gears, a plurality of wage-registers, a plurality of spindles, gearing between each time-controlled gear and a corresponding spindle, a driving gear in axial alinement with each spindle for operating one of the wage-registers, a job-register, a plurality of shafts for driving the job-register, each of such shafts adapted to engage any one of such driving gears and the corresponding spindle, and cumulative gearing between such shafts for driving the job-register at a rate proportional to the sum of the rates of operation of the connected wage-registers.

20. In a wage-registering system, a plurality of intermeshing time-controlled gears, a plurality of wage-registers, a plurality of spindles, gearing between each time-controlled gear and a corresponding spindle, a driving gear in axial alinement with each spindle for operating one of the wage-registers, a plurality of job-registers, a plurality of flexible shafts for driving each job-register, each of such shafts provided with a plug adapted to engage any driving gear and its corresponding spindle, cumulative gearing between the connections of the flexible shafts to each job-register for driving the corresponding job-register at a rate proportional to the sum of the rates of operation of the connected wage-registers, and a totalizing register for indicating the total of the actuation of the job-registers.

21. In a wage-registering system, a plurality of intermeshing time-controlled gears, a plurality of wage-registers, a plurality of spindles, gearing between each time-controlled gear and a corresponding spindle, means for changing the gear ratio between any time controlled gear and the corresponding spindle, a driving gear in axial alinement with each spindle for operating one of the wage-registers, a plurality of job-registers, a plurality of flexible shafts for driving each job-register, each of such shafts provided with a plug adapted to engage any driving gear and its corresponding spindle, cumulative gearing between the connections of the flexible shafts to each job-register for driving the corresponding job-register at a rate proportional to the sum of the rates of operation of the connected wage-registers, and a totalizing register for indicating the total of the actuation of the job-registers.

22. In a wage registering system, the combination of time controlled mechanism, a wage register, a job register, such registers normally disconnected from each other, and from such time controlled mechanism, and means for connecting such registers in series driving relation to the time controlled mechanism by a single operation.

23. In combination, a first register, a driving element, a second element associated with but independent of the first element, such second element constituting the means for driving said first register, connecting mechanism adapted to engage the first two elements, and a second register driven by such connecting mechanism, the engagement of the two elements by the connecting mechanism serving to effect a series driving relation between the two registers and the driving elements to continuously operate both registers.

24. In a wage registering system, a plurality of intermeshing time controlled gears, a plurality of wage registers, a plurality of spindles, gearing between each time controlled gear and a corresponding spindle, a driving gear in axial alinement with each spindle for operating one of the wage registers, a job register, a flexible shaft for driving the job register, and a plug secured to the shaft for engaging any one of the driving gears and the corresponding spindle, such plug so conformed as to effect a series driving relation between the job register and the time controlled gear and wage register connected therewith.

25. In combination, a source of power, a pair of registers normally disconnected therefrom, and means for establishing a flexible operative connection between said source of power and one of said registers, and simultaneously connecting the other register with said source of power.

26. In combination, a source of power, a plurality of normally disconnected registers having predetermined ratios of operation, a second set of registers, and means for mechanically connecting any one of said second set of registers with said source of power and by the same devices operatively connecting a desired one of said first mentioned registers.

27. In combination, a driving means, two sets of registers, the registers of one set having fixed relation to the driving means, and, means for mechanically connecting a desired one of each set simultaneously with the driving means.

28. In combination, a plurality of registers having driving gears of different ratios, a common driving means, and a plug for interchangeably connecting the driving gears of said registers mechanically with the driving means.

29. In combination, a plurality of registers having driving gears of different ratios, a common driving means, a plug for interchangeably connecting the driving gears of said registers mechanically with the driving means, another register and a flexible shaft connected with said plug for driving said other register when the plug is connected to drive one of said plurality of registers.

In witness whereof, I hereunto subscribe my name this 2nd day of March A. D. 1909.

FREDERICK O. HEUSER.

Witnesses:
C. H. TALLMADGE,
ALBERT C. BELL.